United States Patent
Hermann

(10) Patent No.: US 8,557,091 B2
(45) Date of Patent: Oct. 15, 2013

(54) ELECTROLYTIC REACTOR

(75) Inventor: Greg William Hermann, La Grande, OR (US)

(73) Assignee: GlobalSep Corporation, La Grande, OR (US)

( * ) Notice: Subject to any disclaimer, the term of this patent is extended or adjusted under 35 U.S.C. 154(b) by 266 days.

(21) Appl. No.: 12/913,758

(22) Filed: Oct. 27, 2010

(65) Prior Publication Data

US 2012/0103797 A1    May 3, 2012

Related U.S. Application Data

(60) Provisional application No. 61/279,971, filed on Oct. 27, 2009.

(51) Int. Cl.
C02F 1/463    (2006.01)

(52) U.S. Cl.
USPC .................. 204/278.5; 204/672; 204/673

(58) Field of Classification Search
CPC ... C02F 1/46109; C02F 1/46104; C02F 1/463
USPC .............. 204/278.5, 672, 673; 205/742–761
See application file for complete search history.

(56) References Cited

U.S. PATENT DOCUMENTS

| | | | |
|---|---|---|---|
| 4,028,212 A * | 6/1977 | Bowen et al. ................. | 204/272 |
| 4,036,726 A | 7/1977 | Gale et al. ..................... | 204/231 |
| 4,118,307 A * | 10/1978 | LaBarre ........................ | 204/268 |
| 4,361,471 A * | 11/1982 | Kosarek ..................... | 210/748.2 |
| 4,369,737 A * | 1/1983 | Sanders et al. .................... | 123/3 |
| 5,695,644 A * | 12/1997 | Buchanan et al. ............ | 210/696 |
| 5,766,431 A * | 6/1998 | Tanaka et al. ................. | 204/263 |
| 6,560,119 B1 * | 5/2003 | Katsuyama et al. .......... | 361/752 |
| 2001/0042682 A1 * | 11/2001 | Weres et al. ............... | 204/278.5 |
| 2002/0148722 A1 * | 10/2002 | Hermann et al. ............. | 204/242 |
| 2007/0007145 A1 * | 1/2007 | Simmons et al. ............. | 205/357 |
| 2007/0012571 A1 * | 1/2007 | Beckley et al. ............... | 204/667 |
| 2009/0039032 A1 * | 2/2009 | Patera et al. .................. | 210/760 |
| 2011/0272277 A1 * | 11/2011 | Potchen et al. ............ | 204/278.5 |

* cited by examiner

*Primary Examiner* — Nicholas A Smith
*Assistant Examiner* — Ciel Thomas
(74) *Attorney, Agent, or Firm* — K&L Gates LLP

(57) ABSTRACT

An electrolytic reactor consisting of a substantially hollow rectangular plastic housing for supporting a plurality of electrode plates using embedded metal fasteners and metal cap brackets for releasably fastening and sealing end cap members to the end of the reactor housing for sealed and pressurized operation in addition to providing a method for sealing and concentric alignment of electrode connectors within the reactor housing.

15 Claims, 13 Drawing Sheets

ELECTROLYTIC REACTOR

RELATED APPLICATIONS

The present application claims the benefit of U.S. provisional patent application Ser. No. 61/279,971, filed Oct. 27, 2009, for ELECTROLYTIC TREATMENT APPARATUS FOR PRESSURIZED USE, by Greg William Hermann, included by reference herein.

FIELD OF THE INVENTION

This invention relates to electrolytic reactors used for water treatment and more particularly, to a rectangular reactor housing assembled from plastic and capable of operating under pressure for continuous flow through applications.

BACKGROUND OF THE INVENTION

This invention relates to electrolytic reactors used for water treatment and more particularly to a rectangular electrolytic reactor for supporting multiple plate electrodes that is constructed from plastic materials and capable of operating under pressure.

As it is well understood, electrolytic reactors have been used for many types of water treatment processes as an alternative to using treatment chemicals. Electrocoagulation is a popular and more recently used term to describe one of several processes where the present invention can be applied. The process of electrocoagulation involves passing contaminated water between electrodes connected to a source of DC power. The high voltage potential applied to the electrodes forces metal ions to liberate from the surface of electrodes and into the water, causing impurities to coagulate into a larger and denser solid that can then be removed by settling or using conventional filtration equipment. Another example of a process where the present invention could be applied is described in U.S. Pat. No. 4,693,798 and includes a reactor containing two or more electrodes that is used for producing a metal ion solution that can be added to contaminated water for treatment. The process works by adding acid to clean makeup water and then continuously circulating the low pH water through the reactor. The applied DC power forces metal ions to release from the electrodes and mix into the water, thus generating a concentrated solution of metal ions that can be added directly to contaminated water to facilitate precipitation of suspended solids and other contaminants.

Many treatment applications use electrolytic reactors that are sealed and capable of operating under pressure. It is also preferred to use a reactor that supports plate electrodes for ease of maintenance, while also being constructed from plastic material to prevent corrosion and permit the reactor to be flushed periodically with high strength acid to clean the surface of electrodes. In addition, many electrolytic reactors include complex electrical connectors arrangements that make it difficult seal the reactor, therefore, it is also preferred to provide better means of connecting power to electrodes that would prevent the reactor housing from leaking.

U.S. Pat. No. 4,036,726 discloses a tubular reactor housing for supporting multiple plate electrode spaced evenly apart to permit water to flow vertically from the bottom of the reactor and in between the electrically charged electrodes where water is subjected to treatment, followed by exiting the side of the housing near the top of the reactor. The problem with this design is it contains several void and unusable areas in between the plates and the inner wall of the tubular housing, requiring additional unnecessary space that would preferably be used to hold additional electrodes. In addition to the void areas within the reactor housing, the external shape of a cylindrical reactor provides an inefficient use of external space and requires much more area to operate than a rectangular reactor containing the identical size and number of plate electrodes. This type of tubular reactor offers few design options as tubing and piping is typically offered in nominal sizes with very few material options. In addition, the reactor, including the tubular housing, supporting base, and internal components are welded together, preventing disassembly to replace or repair damaged components. A further problem is the method by which electrical connections are made to the electrode plates consist of traditional bolts and nuts that provide an insufficient method of sealing and would require sealing compound each time electrode plates are exchanged for maintenance.

SUMMARY OF THE INVENTION

In accordance with the present invention, there is provided an electrolytic treatment apparatus that includes a square or rectangular plastic housing that supports a plurality of plate electrodes and includes a housing support member consisting of fixtures interconnected using fasteners extending through the housing, whereby the support member connects both ends of the housing together for securing the releasably fastened end cap members, thereby enabling pressurized operation and providing a means to lift the cell vertically from either end of the housing without applying stress to the plastic components that makeup the housing.

The object of this invention is to provide a chemical resistant reactor that can be assembled from plastic sheet or molded plastic components of any selectable type and thickness for assembly and disassembly using integrated metal fasteners, that is capable of operating under pressure and has improved capabilities over reactors of the prior art.

Another objective of this invention is the provision of an electrolytic treatment apparatus of the class described, whereby threaded end cap anchors are embedded directly into the ends of the reactor housing to enable end cap members to be releasably fastened to the ends of the reactor housing.

Another objective of this invention is the provision of an electrolytic treatment apparatus of the class described, whereby the threaded end cap anchors are secured in place using housing assembly bolts that extend through the reactor housing.

Another objective of this invention is the provision of an electrolytic treatment apparatus of the class described, whereby metal side support bars connect to all the housing assembly bolts and extend the length of the reactor housing for improved sealing and to enable for better distribution of pressure or mechanical force between the ends of the reactor housing for lifting the reactor or during operation when subjecting the reactor housing to increased water pressure.

Another objective of this invention is the provision of an electrolytic treatment apparatus of the class described, whereby electrode connectors are welded onto the surface of electrodes for connecting to DC power and include means to seal against the inside of the reactor for liquid tight and pressurized operation.

Another objective of this invention is the provision of an electrolytic treatment apparatus of the class described, whereby alignment slots are provided at the end of the reactor housing to prevent over-travel of the electrode plates being connected to DC power, while providing concentric alignment of the electrode connector welded to the side of the electrode plate and the access hole that enables connection with a threaded fastener for connecting to DC power.

Another objective of this invention is the provision of an electrolytic treatment apparatus of the class described, whereby the fastener arrangement supports the entire weight of the reactor housing, enabling the reactor housing to be lifted out of place for rapid interchangeability for maintenance.

Another objective of this invention is the provision of an electrolytic treatment apparatus of the class described that can be assembled using plastic materials of any type and as required for specific applications and to provide corrosion resistance.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
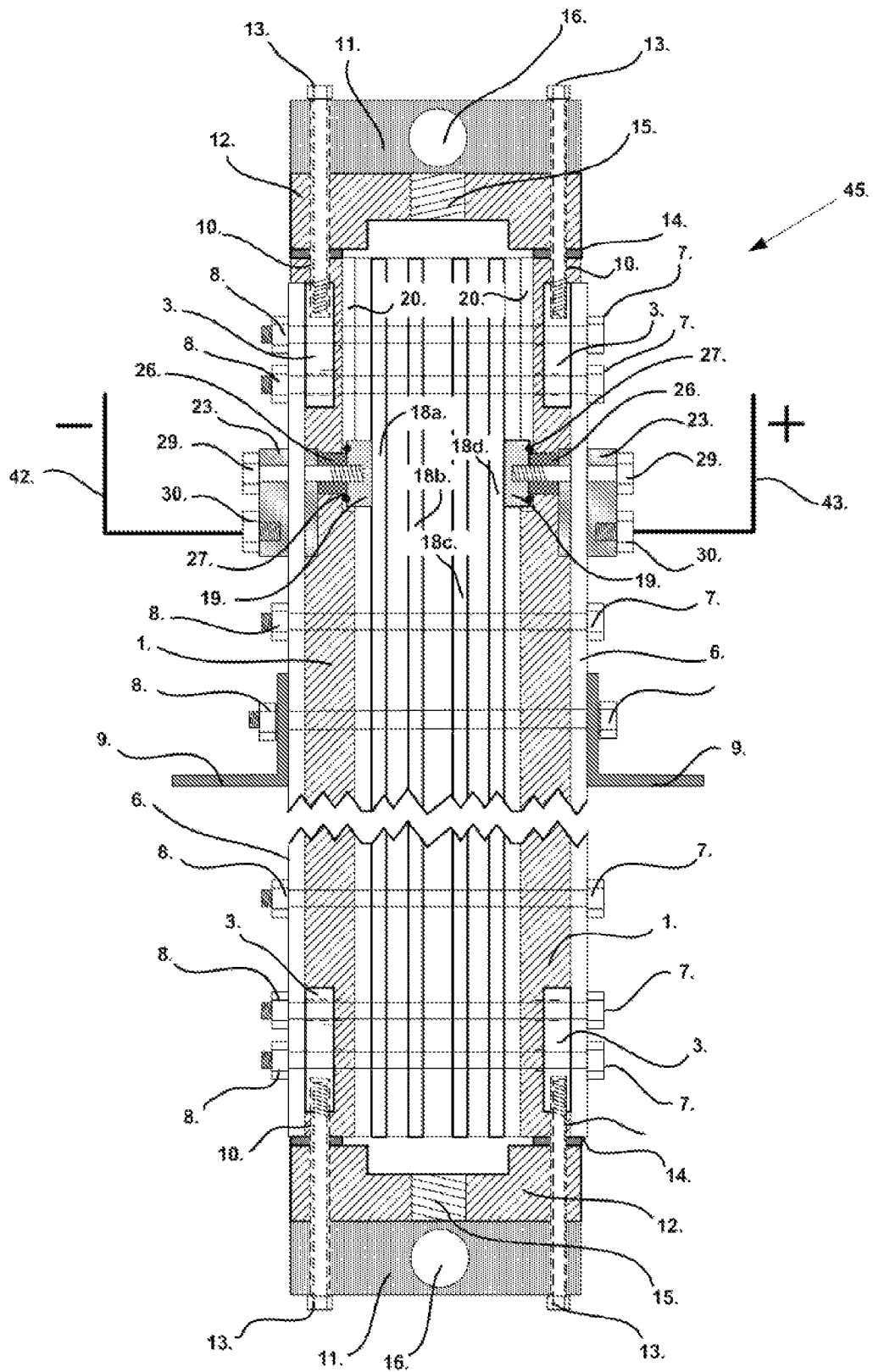
FIG. 1 is a front elevation view of an electrolytic reactor embodying features of this invention, the reaction vessel housing shown in section to expose a plurality of plate electrodes mounted therein.
Figure 2:
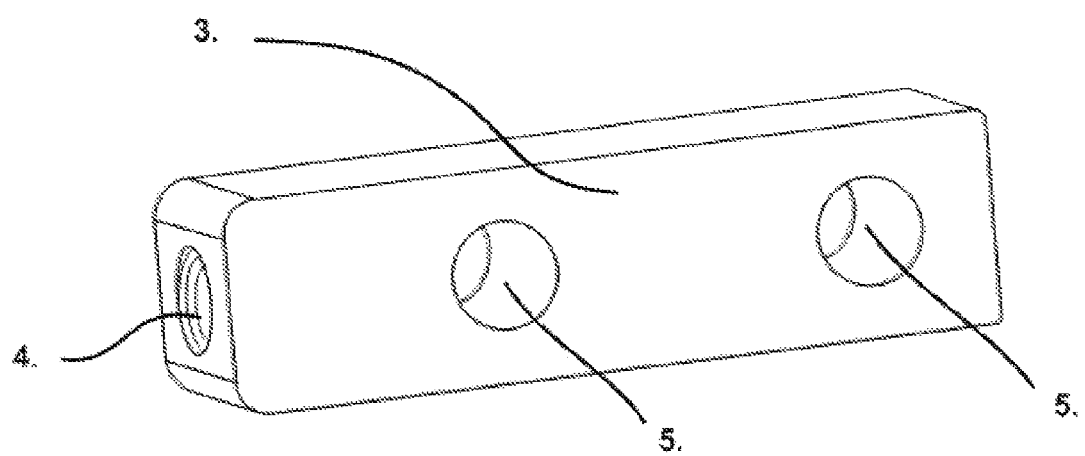
FIG. 2 is a perspective view of an anchor insert for embedding into the sides of the reactor housing to secure the cap members onto the ends.
Figure 3:
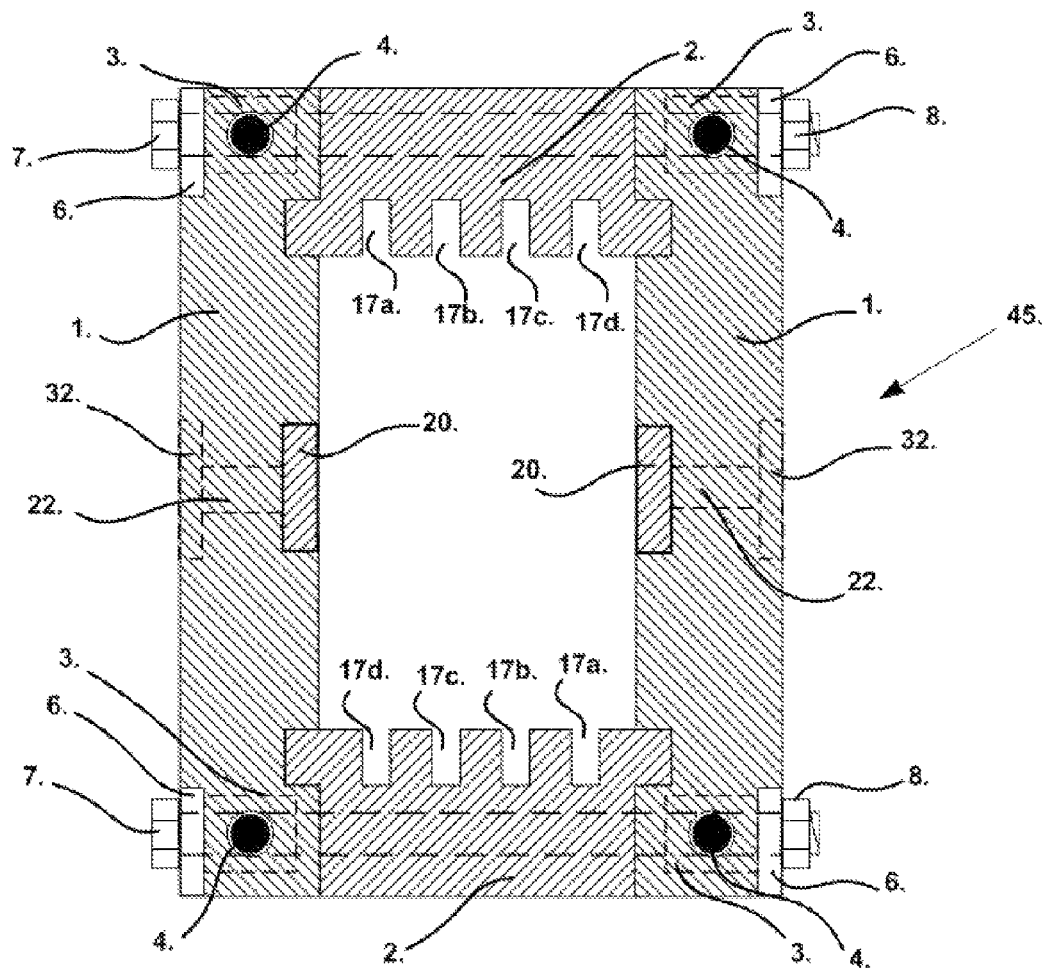
FIG. 3 is a top elevation view of a reactor housing of this invention with the cap members, gaskets, and electrode plates removed.
Figure 4:
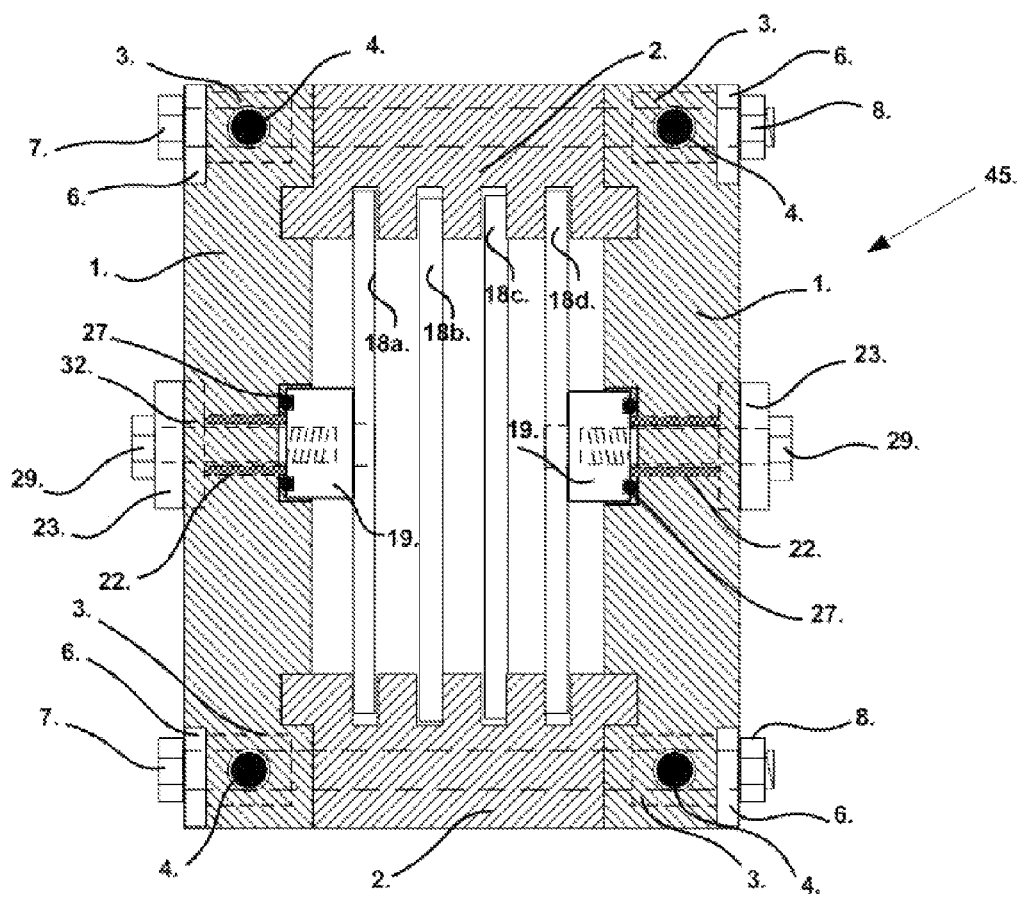
FIG. 4 is a top elevation view of a reactor housing of this invention with the cap members and gaskets removed to reveal electrode plates supported within the reactor housing.
Figure 5:
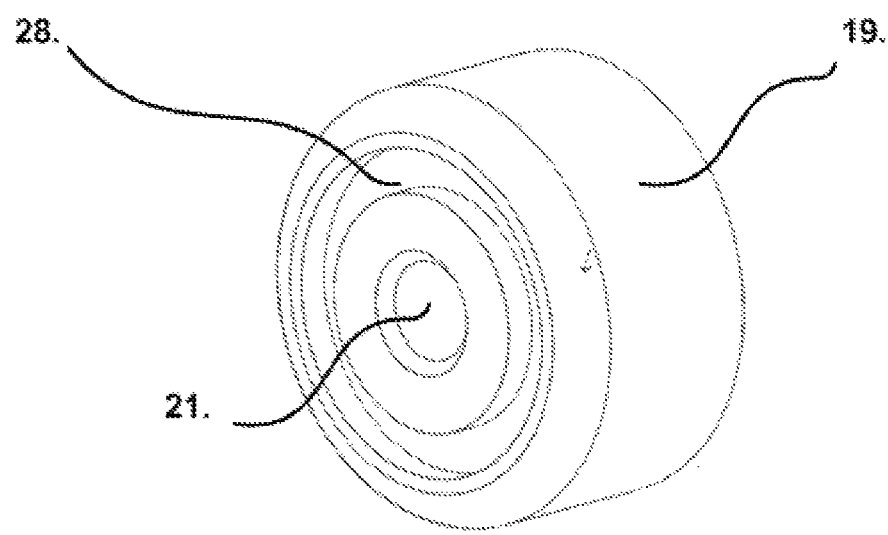
FIG. 5 is a perspective view of an electrode connector welded to the side of the outermost electrode plates for making electrical connection with the power source.
Figure 6:
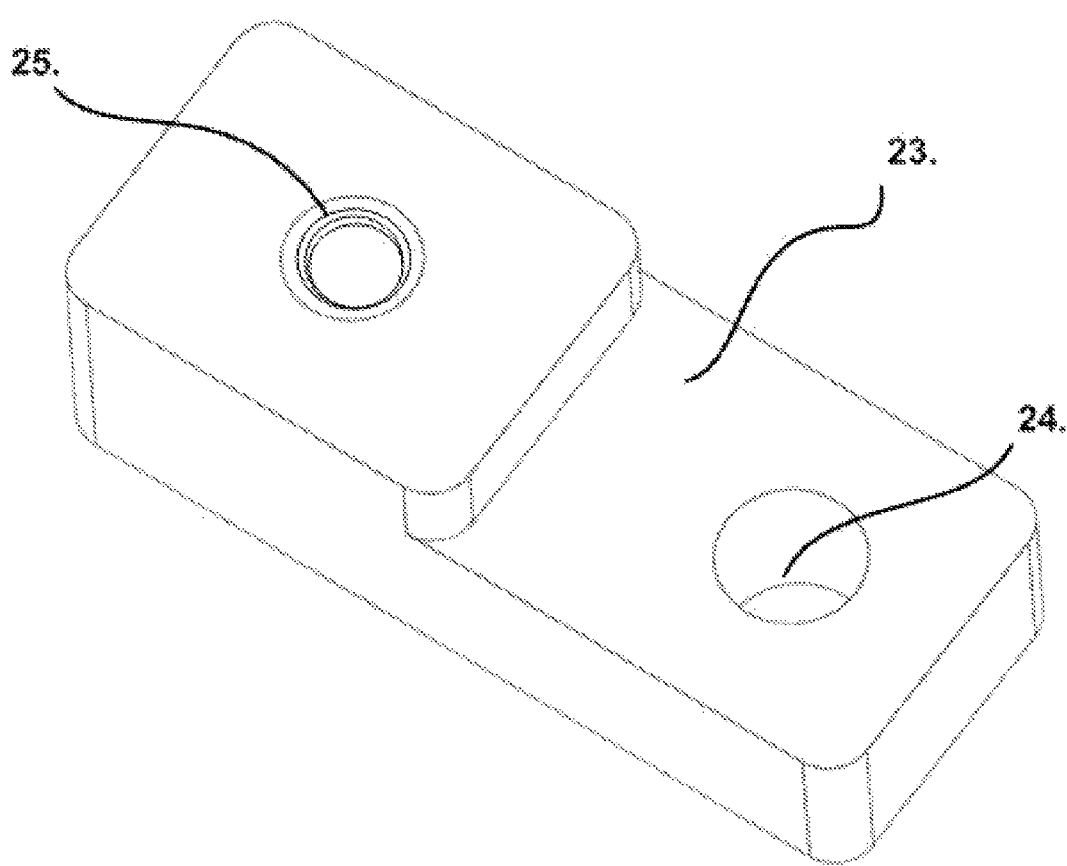
FIG. 6 is a perspective view of a contactor block for connecting power to the electrode connectors and securing electrical wiring connected to the dc power source.
Figure 7:
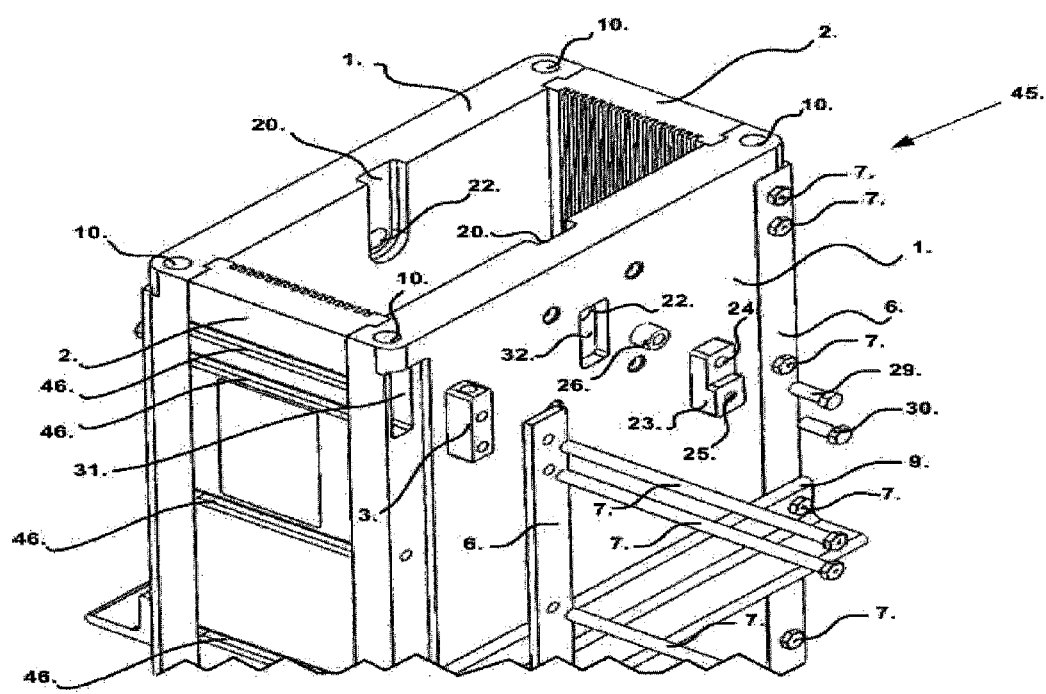
FIG. 7 is a right top partially exploded view of a reactor housing without the cap member, gasket, and electrode plates to reveal the inside of the reactor housing and how various reactor housing components are assembled.
Figure 8:
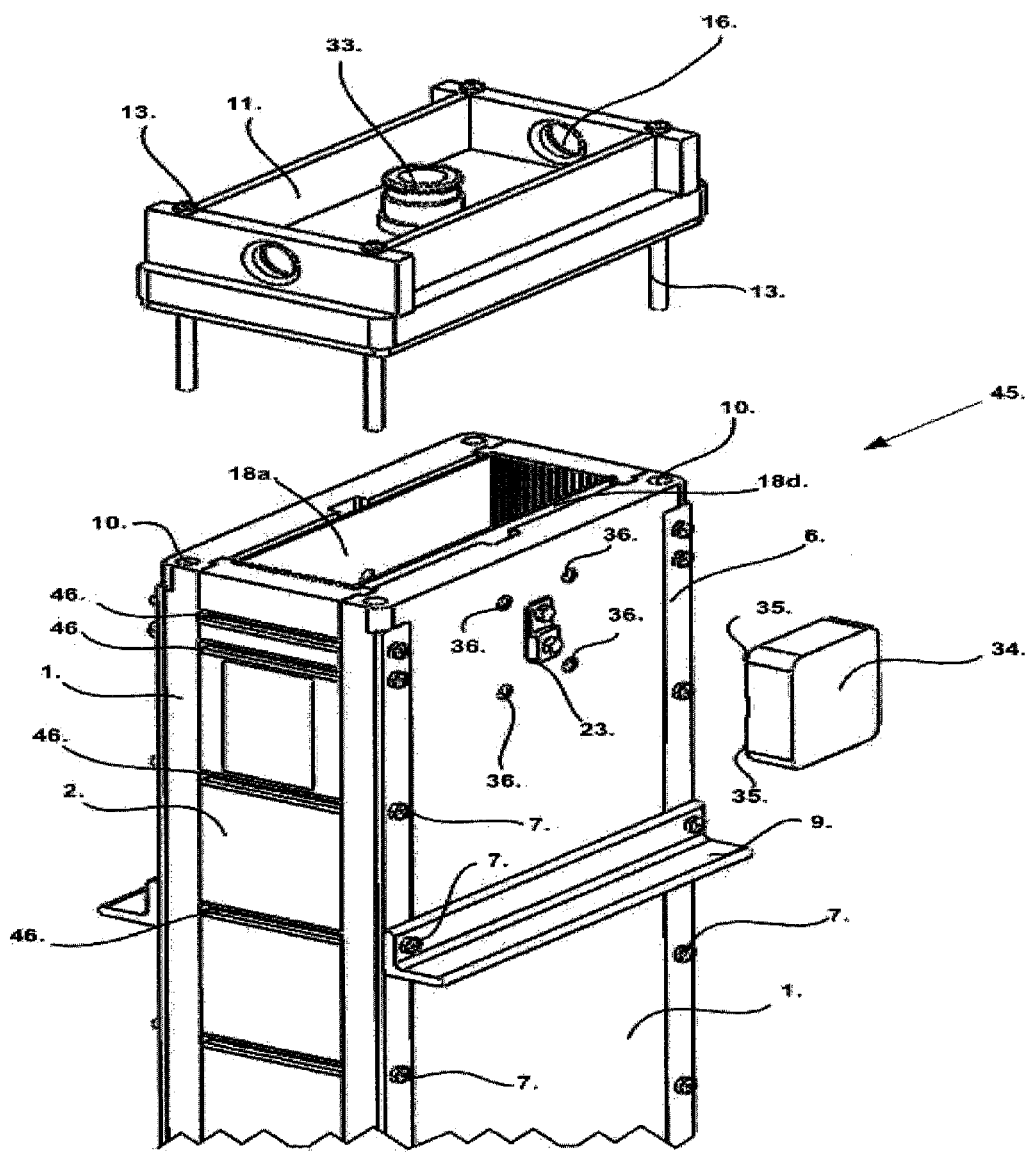
FIG. 8 is a perspective view of a reactor housing with a plastic cap member and a plastic electrical cover being installed onto the reactor housing.
Figure 9:
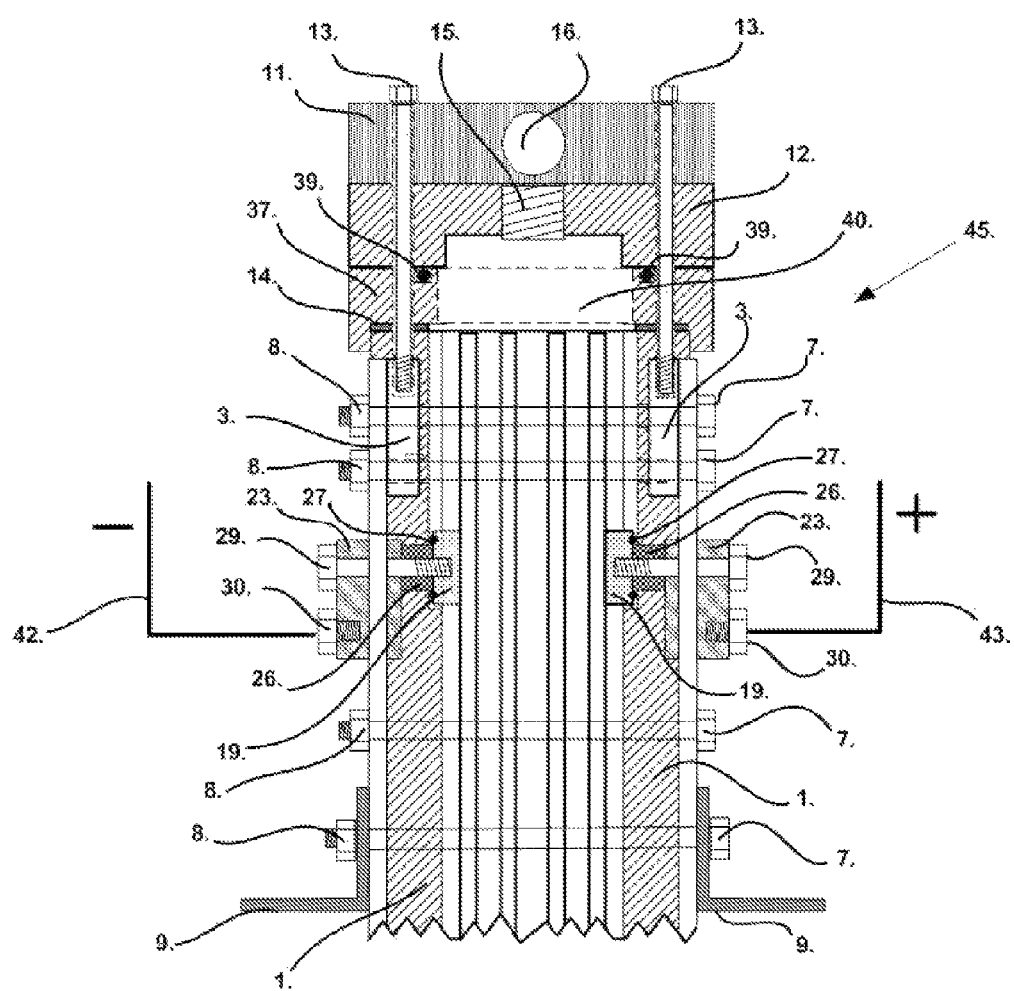
FIG. 9 is a front elevation view of a reactor housing that includes a plastic collar being used in between the end of the reactor housing and the plastic cap member.
Figure 10:
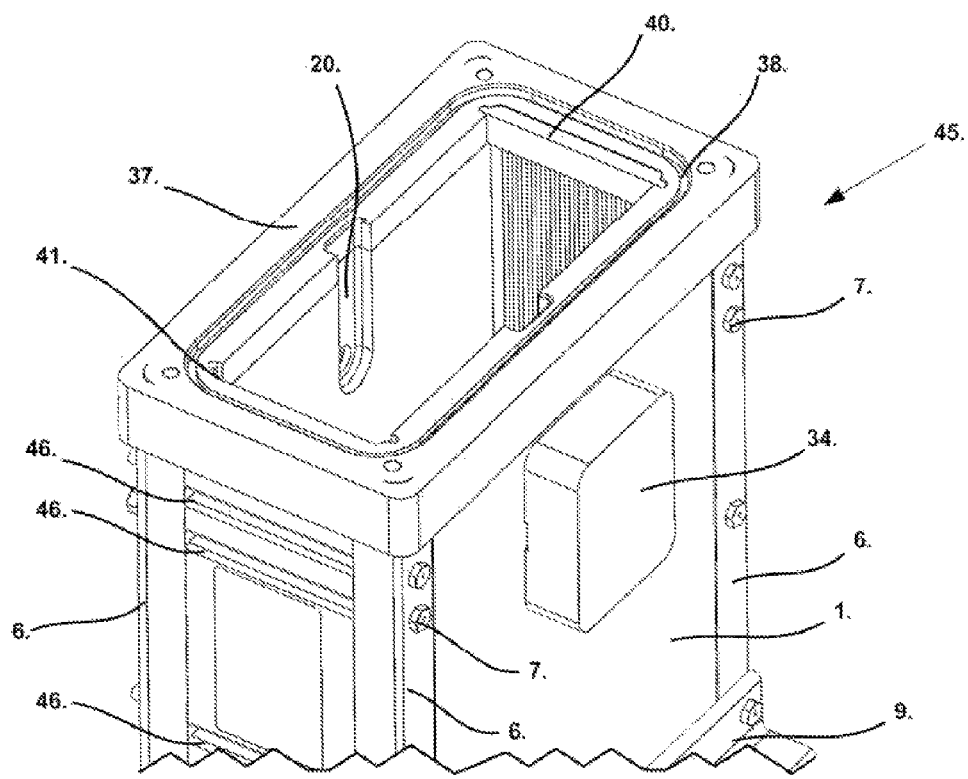
FIG. 10 is a perspective view of a plastic collar positioned on the end of the reactor housing with the plastic cap member and electrode plates removed.
Figure 13:
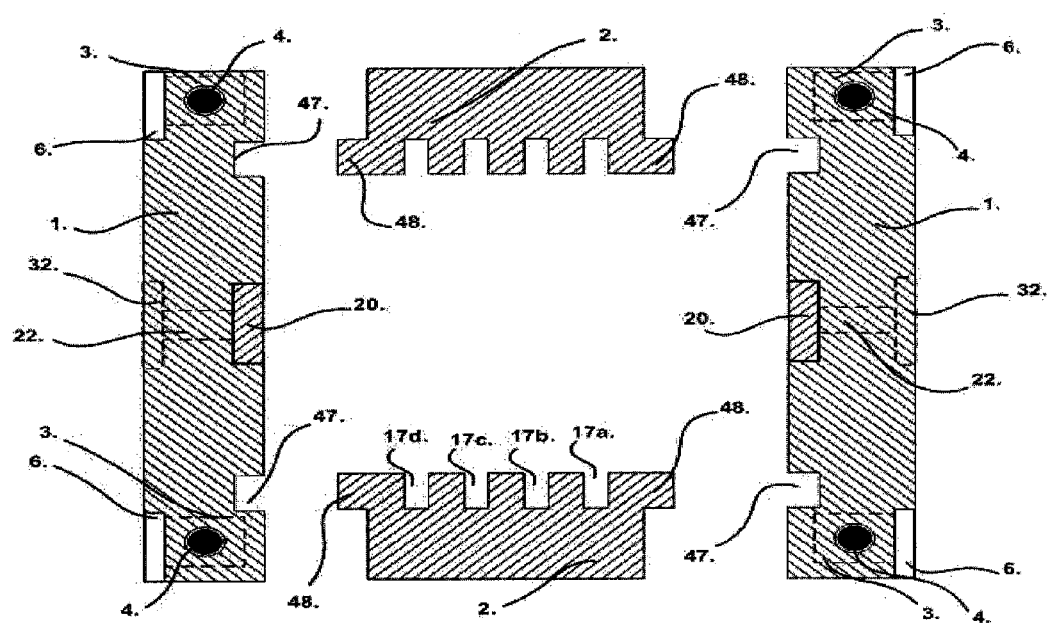
FIG. 13 is a top exploded view of a reactor assembly with the end cap members and electrode plates removed to reveal the tongue and groove arrangement for joining and sealing the non electrode supporting sides to the electrode supporting sides.

FIGS. 1-10 illustrate an electrolytic reactor embodying features of this invention, which will now be described in connection with a first embodiment shown in FIG. 1. The reactor housing 45 is configured to be square or rectangular and with identically opposite ends. The non electrode supporting side 1 consist of electrically non-conductive plastic material such as polypropylene or polyethylene and contains a pair of shallow slots 47 for receiving a pair of mating raised bosses 48 located on a second pair of plastic electrode supporting side 2. This type of "tongue and groove" arrangement shown in FIG. 13 provides alignment and sealing between the sides of the reactor housing 45. Sealing compound such as silicone is applied to the tongue and groove portions of the non electrode supporting side 1 and electrode supporting side 2 during assembly. Insertable fasteners 3 detailed in FIG. 2 consist preferably of stainless steel material with a threaded end 4 and two insertable fastener mount 5 are inserted into the corresponding anchor nut pocket 31 located near each corner of each non electrode supporting side 1. The Side support bar 6 consists of metal such as stainless steel and is placed over the insertable fasteners 3 and extend lengthwise along the non electrode supporting side 1. Assembly bolts 7 are then inserted widthwise through the side support bar 6, and through the insertable fastener mount 5 located on the side of insertable fasteners 3, while continuing through the non electrode supporting side 1, and through electrode supporting side 2, and eventually threading into the housing assembly nuts 8 positioned on the surface of the side support bar 6 located on the opposite side of the reactor housing 45. Assembly bolt slots 46 shown in FIGS. 7, 8, 10 are provided on the outermost side of the electrode supporting side 2 as opposed to using holes for accepting the assembly bolts 7. The assembly bolt slots 46 extend the width of the electrode supporting side 2 and are preferred over using holes through the electrode supporting side 2 for ease of manufacturing, especially for larger reactor housings, where it would be impractical and difficult to drill holes through the entire width of the electrode supporting side 2. Once assembled, torque is applied to the assembly bolts 7, to provide a liquid tight seal between the electrode supporting side 2 and the non electrode supporting side 1. Metal reactor mounting brackets 9 consisting of angle iron can also be secured to the non electrode supporting side 1 during assembly using slightly longer assembly bolts 7 to compensate for the additional material thickness. The reactor mounting brackets 9 enable the reactor housing 45 to be suspended in between beams or framework during operation and can also be used for lifting and transporting the reactor housing 45. Additional reactor mounting brackets 9 may be secured along the non electrode supporting side 1 as required for additional support that would enable the reactor housing 45 to operate at much higher pressures. As it should be apparent, the side support bar 6 communicate with all the assembly bolts 7, enabling the weight and operating pressure of the reactor housing 45 to be displaced evenly among all the assembly bolts 7 during operation. The ends of non electrode supporting side 1 include end cap anchor access holes 10 that could also be configured as machined slots extending from the end of the non electrode supporting side 1 and into the anchor nut pocket 31 of the reactor housing 45 for exposing the threaded end 4 of the insertable fasteners 3. A end cap bracket 11 consisting of welded steel bar stock is recessed into the top of the plastic end cap member 12. Alternatively the end cap bracket 11 can be fastened to the end cap member 12 using screws (not shown) or by other conventional fastening means. The end cap member 12 fasten to the ends of the reactor housing 45 housing long end cap bracket fasteners 13 that insert through the end cap bracket 11, and through the end cap member 12, and threaded into the threaded end 4 of the insertable fasteners 3. A housing gasket 14 is positioned between the end cap member 12 and the end of the reactor housing 45 to seal the reactor housing 45 as torque is applied to the end cap bracket fasteners 13. The end cap bracket 11 is essential for sealing the end of the reactor housing 45, as the support bracket provides sufficient tensile strength to prevent the plastic end cap member 12 from flexing during operation and provides a positive seal against the housing gasket 14 with sufficient torque applied using the end cap bracket fasteners 13. It should be pointed out that the assembly bolts 7, side support bar 6, and insertable fasteners 3 connect both ends of the reactor housing 45 together, therefore, pressure during operation of the reactor housing 45 is distributed evenly only the entire length of the reactor for superior pressure handling capabilities. The housing gasket 14 may also be integrated into the end cap member 12 as an option. Plumbing connection ports 15 serve as either the inlet or outlet of the reactor housing 45, enabling liquid to flow through the reactor housing 45 in either direction as desired. Plumbing connection ports 15 preferably consists of female pipe threads located on the end cap member 12 for securing or threading into place pipe fittings or other connectors for connecting to pipe or tubing to permit water flow through the ends of the reactor housing 45. Multiple plumbing connection ports 15 may provided on the top or side of the end cap member 12, and depending on custom or specific operating requirements. Lifting features 16 located on the cap support bracket are used for lifting the reactor housing 45 for rapid interchangeability. The electrode supporting side 2 include electrode supporting sides 17a, 17b, 17c, 17d, that are machined or molded lengthwise for supporting the electrode plates 18a-18d. During assembly, the electrode supporting sides 17a-17d are positioned to face each other as shown in FIG. 3 and FIG. 4. With the end cap member 12 removed, electrode plates 18a-18d consisting of metal such as stainless steel, carbon steel or aluminum are inserted through the ends of the reactor housing 45 and in between electrode supporting sides 17a-17d. Electrode plates 18a, 18d may also consist of non-sacrificial electrode material that such as graphite, ceramic, conductive glass, metal substrate coated with conductive graphite resin, and conductive plastics for reduced maintenance to eliminate needing to replace electrode connector 19. The electrode supporting sides 17a-17d provide parallel and substantially equally spacing of the electrode plates 18a-18d. The metal electrode connector 19 detailed in FIG. 5 is welded directly to each of the outermost electrodes 18a, 18d. When inserted into the housing, the electrode connector 19 aligns with electrode connector slot 20 located on the inside of the non electrode supporting side 1. The electrode connector slot 20 prevents over-travel when installing the electrode plates 18a, 18d, and ensures concentric alignment between the electrode connector 19 and the electrical access hole 22 located on the non electrode supporting side 1 for making electrical connection. The Power distribution block 23 shown in FIG. 6 consists of electrically conductive metal such as aluminum or brass and includes a electrical bolt thru hole 24 and a threaded electrical connection 25 for connecting to the power source. The power distribution block 23 is pressed into the power distribution block pocket 32 located on each of the two non electrode supporting side 1 and the electrical bolt thru hole 24 are concentric to the electrical access hole 22 machined into the non electrode supporting side 1 and electrode connector threads 21 located on the electrode connector 19 that are welded directly onto the electrodes 18a, 18d. The electrical contact bushing 26 is inserted into the electrical access hole 22 and pressed against the electrode connector 19 inside the electrode connector rubber seal 27 already pressed into the electrode connector rubber seal pocket 28 of the electrode connector 19. The Electrode connector bolt 29 is then inserted through the electrical bolt thru hole 24 located on the power distribution block 23 and through the electrical contact bushing 26 and threaded into the electrode connector threads 21 of the electrode connector 19. As the electrode connector bolt 29 are threaded into the electrode connector 19, the applied torque causes the electrode connector 19 to pull into the non electrode supporting side 1, causing the electrode connector rubber seal 27 to press against the non electrode supporting side 1 to provide a liquid tight seal, while also causing the electrical contact bushing 26 to be pressed in between the electrode connector 19 and the power distribution block 23 for positive electrical contact. The power source connector bolt 30 threads into the threaded electrical connection 25 located on the power distribution block 23 for securing electrical wiring 42, 43 using common means such as spade connectors (not shown).

Contaminated water flows through the reactor on a continuous basis, while DC power attached to the power distribution block 23 is applied to electrode plates 18a, 18d. The water provides the conductive medium that enables electrical current to flow between electrode plates 18a-18d. The applied DC power causes the electrode plates 18a-18d to liberate metal ions from the surface and into the water passing through the reactor, causing contaminants in the water to coagulate upon exiting the reactor housing 45. While the treatment process just described is the preferred method of using the apparatus of this invention, other treatment processes may be employed, depending on the electrode type and the type of power being applied.

The treatment apparatus of this invention can be operated either horizontally or vertically. If using horizontally, it is preferred to apply back pressure to the reactor housing 45 since it is well known that gas bubbles produced through electrolysis remain dissolved or suppressed under pressure, which eliminates gas buildup if operating horizontally. In addition, when using the treatment apparatus of this invention for electrocoagulation, the differential pressure assists in flotation of coagulated solids upon exiting the cell as gas bubbles expand. It should be readily apparent that there are other water treatment processes that could benefit from the apparatus of this invention aside from electrocoagulation or metal hydroxide generation. Such processes may include the use of non-sacrificial electrodes for merely oxidizing the water. Therefore, this apparatus of this invention is intended to encompass the housing mechanism for supporting the electrode plates 18a-18d as explained herein.

FIG. 7 illustrates the top portion of the housing of the apparatus of this invention with the end cap member 12, end cap bracket 11 removed, along with the electrode plates 18a-18d. The illustration gives a diametric and exploded perspective of many of the features and components previously explained in association with FIG. 1.

FIG. 8 illustrates a diametric view of the end cap member 12 and end cap bracket 11 prior to fastening to the end of the reactor housing 45. In addition, the illustration shows a plastic cam connector 33 positioned into plumbing connection ports 15. A plastic electrical cover 34 protects the power distribution block 23 during operation and is secured against the non electrode supporting side 1 using male pegs 35 protruding from the plastic electrical cover 34 that aligns and press into tapered female pockets 36 located on the non electrode supporting side 1.

FIG. 9 Illustrates an alternate configuration of the apparatus of this invention, which includes a plastic collar 37 placed between the end of the housing and the end cap member 12. The plastic collar 37 may be sealed against the end of the reactor housing 45 using silicone or placed directly onto the housing gasket 14. The plastic collar 37 may be preferred for applications that require a more permanent seal against the housing, as the plastic collar 37 remains pressed against the reactor housing 45 during maintenance, therefore the sealant or housing gasket 14 is not disturbed during maintenance. Plumbing connections (not shown) can also be applied to the plastic collar 37 as an alternative placing or using plumbing connection ports 15 located on the end cap member 12. This may be preferred for applications that choose to use rigid piping and prefer removing the end cap member 12 without disturbing the plumbing connections. The plastic collar 37 includes a o-ring pocket 38 shown in FIG. 10 for inserting an o-ring 39, which seals against the end cap member 12. End cap bracket fasteners 13 enter through holes located on the plastic collar 37 and are threaded into the insertable fasteners 3. As the end cap bracket fasteners 13 are threaded into place, the end cap member 12 presses into the plastic collar 37, which in turn presses into the housing gasket 14 to seal the reactor housing 45. Plastic electrode braces 40 are inserted into electrode brace slots 41 shown in FIG. 10 located on the ends of the plastic collar 37 and serve as a rest for the electrode plates 18a-18d when the reactor housing 45 is operated in its vertical position. The electrode braces 40 also serve as a stopper to prevent the electrode plates 18a-18d from moving when the reactor housing 45 is operated in a horizontal position. FIG. 10 provides an exploded view of the embodiment in FIG. 9.

Figure 11:
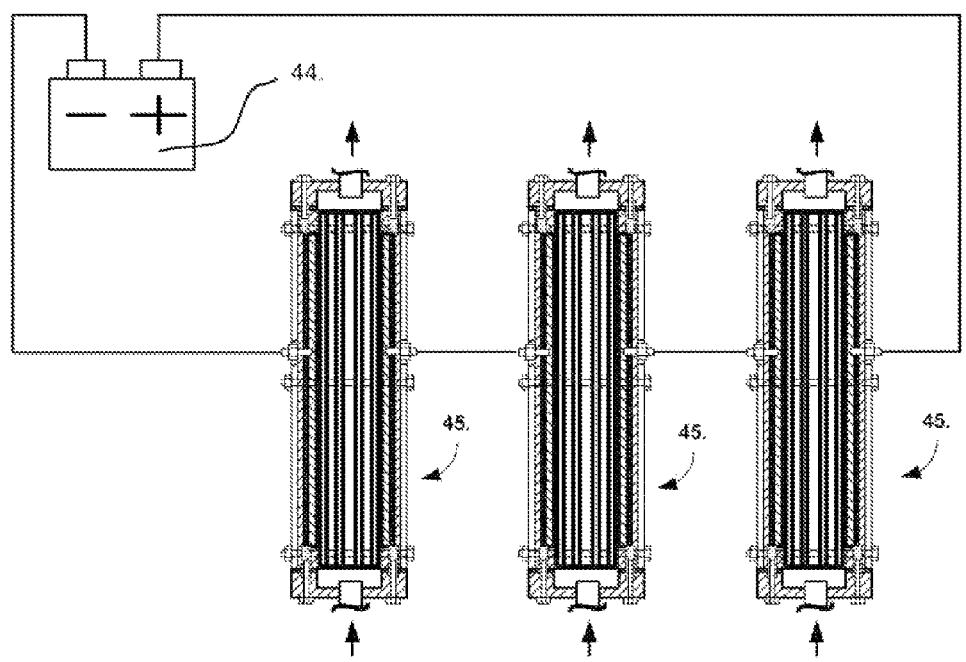
FIG. 11 is an elevation view of a three reactors of this invention wired in series to a source of dc power.

Power requirements are dictated by the particular treatment process and type of electrodes being used. The power supply 44 can include solid state automatic polarity reversal to provide even electrode wear and reduce the buildup of scaling on the surface of electrode 18a-18d. Power supplies 44 that provide a low voltage output are preferred for cooler operation. Power supplies 44 that provide a low voltage output or that provide modulated output have shown to reduce power consumption and provide capacitive charging for improved performance, including a reduction in power loss and reduced heat or thermal energy buildup within the reactor housing 45. Certain applications may also accept AC power to be used instead of DC. In addition, the reactor housing 45 of this invention can be connected to individual power supplies 44 or a single power source, which reactor housings 46 may be connected to power in a parallel or series to the power supply 44. FIG. 11 Illustrates multiple reactor housings 46 of this invention connected in series to a single DC power supply 44. Additionally, a power supply 44 may be fastened or molded directly to one of the plastic end cap member 12 or non electrode supporting side 1, which electrical wiring 42, 43 could be integrated into the reactor housing 45 to make electrical connection with the power distribution block 23.

Figure 12:
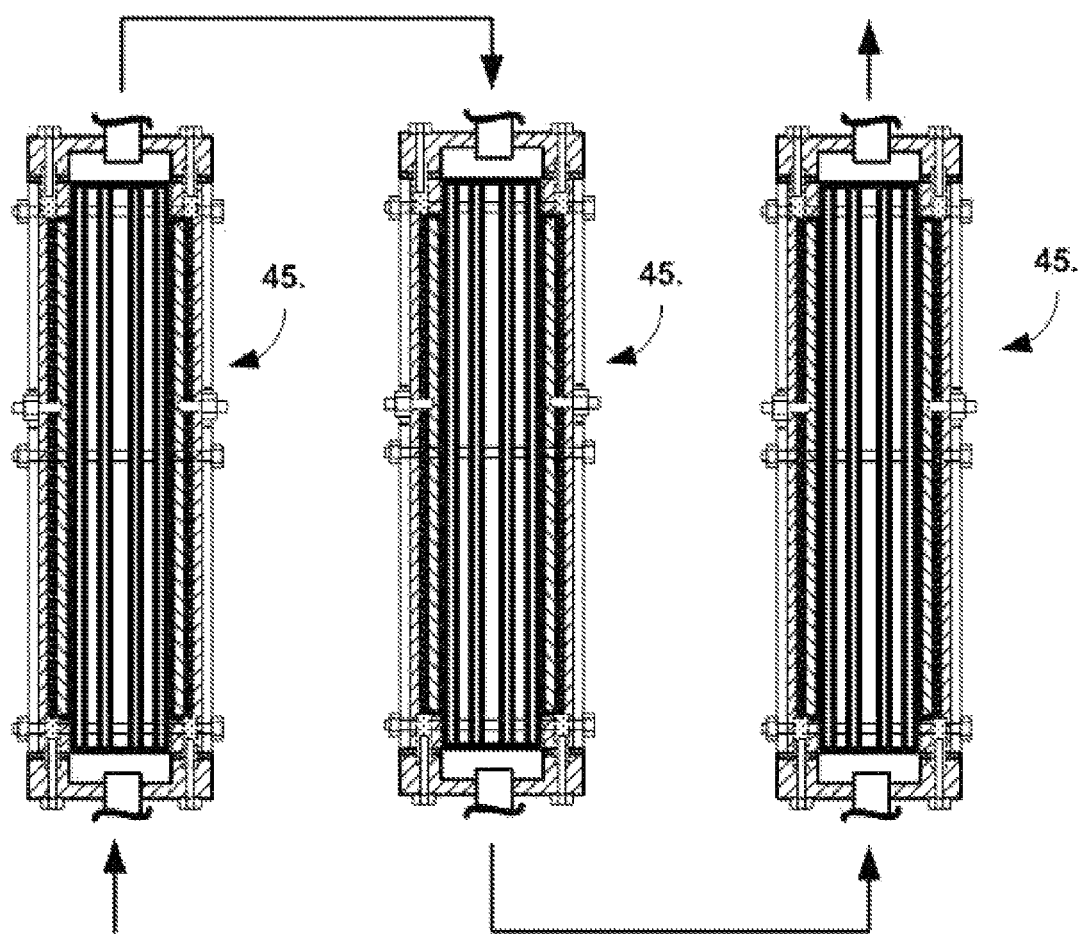
FIG. 12 is an elevation view of a three reactors of this invention plumbed in series.

It may be desired to place the reactor housings 46 in series as shown in FIG. 12, particularly if the apparatus of this invention is operated horizontally to enable higher velocity of liquid flowing through housing to prevent buildup of solids, while providing additional retention time for treatment. It may also be desired to provide a method of staged treatment, whereby, different types of electrode plates 18a-18d are used to provide a different type of treatment with each pass through the different reactor housing 45. As an example, one reactor housing 45 may have electrode plates 18a-18d consisting of aluminum electrode material, while a second reactor housing 45 contains iron electrode plates 18a-18d, which the liquid is passed through the first reactor housing 45 and immediately through a second reactor housing 45 to receive treatment from both.

The reactor housing 45 of this invention may be scaled to any size so as to provide a treatment device for personal carry, commercial, and industrial use. Any number and size of electrode plates 18a could be used with this invention other than what has been illustrated. The size of the reactor housing 45, will generally be scaled according to the volume of liquid that needs treated, although multiple reactor housings 46 as described hereinbefore can be connected to a common power supply 44 to increase overall volume of liquid being processed or treated. As also discussed, it may be desirable that the output of one reactor housing 45 to be plumbed directly to the inlet end of a second reactor housing 45 to enhance treatment. As will also be apparent to those skilled in the art the output of the treatment apparatus of this invention may be directed to other filtering devices arranged to provide additional treatment of the liquid as needed or desired. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An electrolytic reactor for the treatment of liquids, comprising:
   an electrically non-conductive reactor housing having a substantially rectangular shape and a pair of opposing end openings, said reactor housing comprising a plurality of assembly bolt openings and a support structure;
   a plurality of metal insertable fasteners, each of said insertable fasteners being positioned near one of the end openings of the reactor housing and comprising a threaded hole oriented in a first direction and at least one assembly bolt hole oriented in a second direction substantially orthogonal to the first direction;
   a plurality of side support bars, each of said side support bars comprising metal and defining at least one assembly bolt opening, each of said side support bars being positioned adjacent an external surface of the reactor housing;
   a plurality of assembly bolts, each assembly bolt passing through one of the assembly bolt openings in one of the side support bars, one of the assembly bolt holes in one of the insertable fasteners, and one of the assembly bolt openings in the reactor housing, thereby fixedly securing the plurality of insertable fasteners and the plurality of side support bars to the reactor housing such that each of the plurality of side support bars provide structural reinforcement for the reactor housing;
   a pair of electrically non-conductive end cap members, each of said end cap members comprising a plurality of bracket fastener openings and being positioned to seal one of the end openings of the reactor housing;
   a pair of metal end cap brackets, each end cap bracket comprising a plurality of bracket fastener openings and being positioned adjacent to a side of one of the end cap members opposite the end opening of the reactor housing;
   a plurality of threaded end cap fasteners, each of said end cap fasteners passing through one of the bracket fastener openings in one of the end cap brackets and one of the bracket fastener openings in one of the end cap members, and being threaded into one of the threaded holes of one of the insertable fasteners so as to compress the end cap member, end cap bracket, and the reactor housing together, thereby releasably sealing the end opening of the reactor housing with the end cap member;

a plurality of electrode plates retained inside said reactor housing by the support structure in a substantially parallel orientation;

a pair of electrically conductive electrode connectors, each of said electrode connectors bein welded to one of said electrode s lates and com risin a threaded hole;

a pair of electrically conductive power distribution blocks, electrically couplable to a power source, each of said power distribution blocks defining at least one electrode connector bolt opening and being positioned adjacent an exterior surface of the reactor housing; and a pair of electrically conductive electrode connector bolts, each of said electrode connector bolts passing through one of the electrode connector bolt openings in one of the power distribution blocks and being threaded into one of the threaded holes in one of the electrode connectors so as to electrically couple the power distribution block to the electrode plate coupled to the corresponding electrode connector.

2. The electrolytic reactor of claim 1, wherein one of said end cap members includes a liquid inlet and the other end cap member includes a liquid outlet for introducing a flow of liquid through said reactor housing in a continuous, regulated flow.

3. The electrolytic reactor of claim 1, wherein each of said end cap brackets comprises a lifting feature for connecting to and lifting said reactor housing.

4. The electrolytic reactor of claim 1, wherein said support structure comprises a plurality of slots, integrally molded into the interior of said reactor housing, each of said slots receiving an edge of one of the electrode plates.

5. The electrolytic reactor of claim 1, wherein said metal electrode connector comprises an insertable rubber seal sealably pressing against the interior of said reactor housing.

6. The electrolytic reactor of claim 1, wherein said reactor housing comprises an integrally molded slot on at least one end of said reactor housing, said electrode connector being received in the molded slot, thereby providing concentric alignment of said electrode connector with said electrode connector bolt.

7. The electrolytic reactor of claim 1, wherein said reactor housing comprises reactor mounting brackets for suspending the reactor housing between structural framework for mounting and for supporting sides of the reactor for higher operating pressure requirements, said reactor mounting brackets being rigidly fastened to sides of said reactor housing.

8. The electrolytic reactor of claim 1, wherein said reactor housing comprises a set of metal electrical contact bushings providing electrical coupling between the power distribution block and the electrode connector.

9. The electrolytic reactor of claim 1, wherein said reactor housing comprises a plurality of rubber gaskets, each rubber gasket sealing one of the end openings of said reactor housing.

10. The electrolytic reactor with of claim 1, further comprising:

a plastic collar coupled to one of the end openings of the reactor housing and positioned between said one of the end openings and the corresponding end cap member; and an o-ring positioned between the plastic collar and the corresponding end cap member, said o-ring providing a seal between the plastic collar and the corresponding end cap member.

11. The electrolytic reactor of claim 10, wherein said plastic collar comprises at least two electrically non conductive members preventing movement of electrode plates within said reactor housing.

12. The electrolytic reactor in accordance with of claim 10, wherein said plastic collar comprises a liquid inlet or a liquid outlet for introducing a flow of liquid through said reactor housing in a continuous, regulated flow.

13. The electrolytic reactor of claim 1, wherein said reactor housing comprises four sides, said four sides comprising:

a first non-electrode supporting side comprising a first slot and a second slot;

a second non-electrode supporting side opposite the first non-electrode supporting side and comprising a third slot and a fourth slot;

a first electrode supporting side comprising a first raised boss and a second raised boss, said first raised boss being received in the first slot and said second raised boss being received in the third slot; and a second electrode supporting side comprising a third raised boss and a fourth raised boss, said third raised boss being received in the second slot and said fourth raised boss being received in the fourth slot.

14. The electrolytic reactor of claim 13, further comprising a sealing compound applied between the first raised boss and the first slot, between the second raised boss and the third slot, between the third raised boss and the second slot, and between the fourth raised boss and the fourth slot.

15. The electrolytic reactor of claim 1, wherein said reactor housing and said pair of end cap members comprise plastic.

* * * * *